United States Patent

Rogers et al.

[15] 3,659,667
[45] May 2, 1972

[54] VEHICLE FRONT WHEEL DRIVE ASSEMBLY

[72] Inventors: John A. Rogers; Fredrick R. Bossard, both of Fort Dodge, Iowa

[73] Assignee: Standard Engineering Co., Inc., Fort Dodge, Iowa

[22] Filed: Dec. 19, 1969

[21] Appl. No.: 886,472

[52] U.S. Cl.................................180/6.2, 192/108, 192/114
[51] Int. Cl............................................................B62d 11/08
[58] Field of Search..............180/6.2; 192/108 X, 67, 114 X

[56] References Cited

UNITED STATES PATENTS

| 1,214,673 | 2/1917 | Harrah | 180/6.2 UX |
| 1,270,480 | 6/1918 | McCloskey | 180/6.2 UX |
| 1,322,306 | 11/1919 | Jacobs | 180/6.2 |
| 1,368,795 | 2/1921 | Groce | 180/6.2 |
| 1,463,490 | 7/1923 | Slider | 192/114 X |
| 1,734,718 | 11/1929 | Donald | 180/6.2 |
| 2,608,883 | 9/1952 | Luebben | 180/6.2 X |
| 2,611,442 | 9/1952 | Thomas | 180/6.2 |

Primary Examiner—Benjamin Hersh
Assistant Examiner—Leslie J. Paperner
Attorney—Zarley, McKee & Thomte

[57] ABSTRACT

A drive assembly for a front wheel drive vehicle wherein a gear box is connected by a drive shaft and in turn provides driven shafts extending in opposite directions for connection with separate clutches which in turn are connected to the respective front wheels. Each of the clutches includes a pair of jaw portions semicylindrical in shape when in engagement with each other form a cylindrical drive member. Each of the jaw members are keyed to separate shafts for rotation therewith and an actuating lever is connected to a yoke in turn connected to one of the jaw members for sliding it along its shaft into and out of engagement with the other axially stationary jaw.

4 Claims, 4 Drawing Figures

PATENTED MAY 2 1972   3,659,667
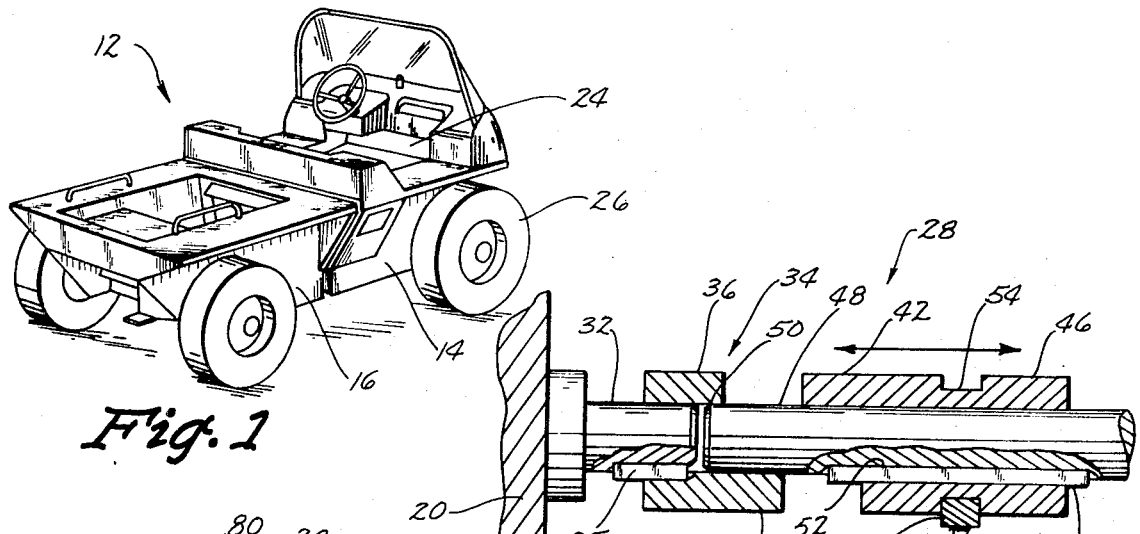
Fig. 1
Fig. 4
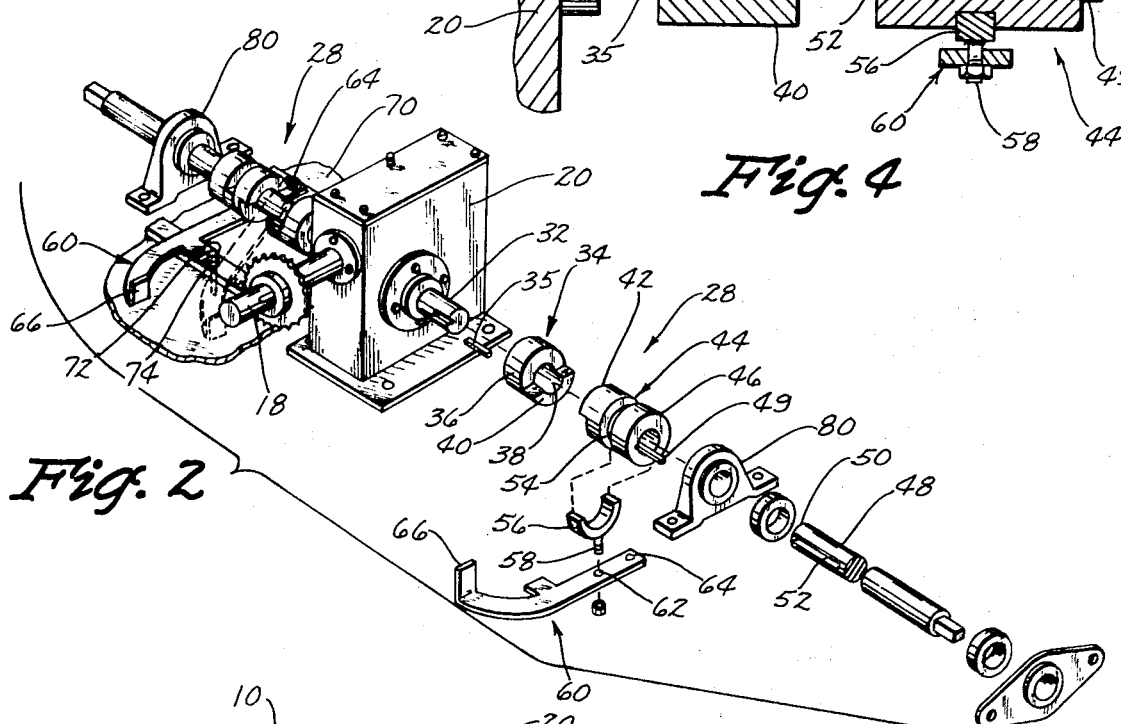
Fig. 2
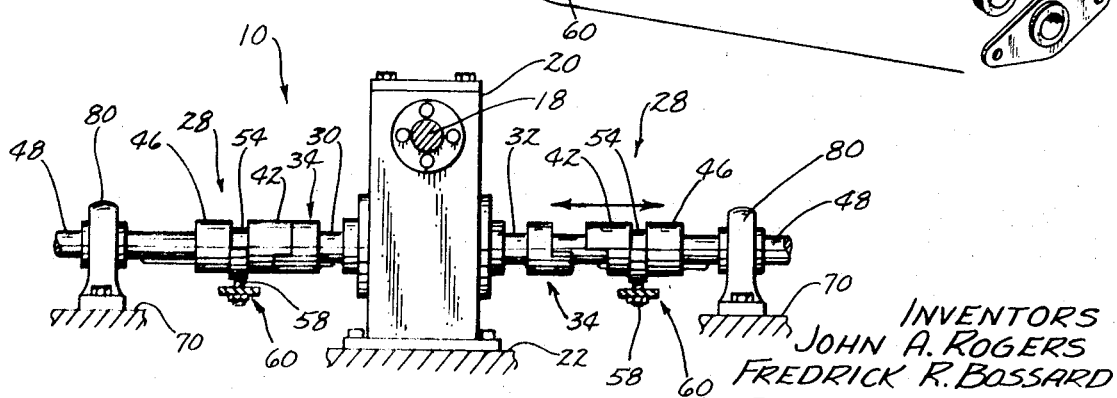
Fig. 3
INVENTORS
JOHN A. ROGERS
FREDRICK R. BOSSARD
BY
Zarley, McKee & Thomte
ATTORNEYS

VEHICLE FRONT WHEEL DRIVE ASSEMBLY

The front wheel drive assembly of this invention is intended for use in a vehicle adapted to be driven over all types of terrain and in water. The vehicle includes two body units rotatably relative to each other about an axis parallel to the longitudinal axis of the vehicle whereby all driven wheels, front and rear, may maintain engagement with the ground at all times.

A drive assembly makes it possible for the front wheels to individually be powered since separate clutches on opposite sides of the gear box are provided. The drive assembly and gear box along with the hand levers are all located in the driver's compartment on the floor board. The outer ends of the driven shafts extend through the body sidewalls for connection to U-joints which in turn are connected to the front wheels. The steering assembly also is connected to the front wheels through a king pin assembly between the U-joint and the front wheels.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of a vehicle having a front wheel drive assembly of this invention;

FIG. 2 is a fragmentary partially exploded view of the front wheel drive assembly;

FIG. 3 is an elevation view of the drive assembly; and

FIG. 4 is a fragmentary cross-sectional view enlarged in scale showing the jaw members and separate shafts of the drive assembly.

The drive assembly of this invention is referred to generally in FIG. 3 by the reference numeral 10 and is used in an all terrain type vehicle 12 seen in FIG. 1. The vehicle 12 includes a front body 14 rotatably connected to a rear body unit 16 along an axis parallel to the longitudinal axis of the vehicle. The engine not shown is in the front body 14 and includes a drive shaft connected to a shaft 18 in turn connected to a front wheel drive gear box 20 positioned on the floor board 22 in the driver's compartment 24.

The gear box 20 is connected to the front wheels 26 on opposite sides of the body unit 14 by identical clutch assemblies 28.

The gear box 20 includes oppositely extending powered shafts 30 and 32. The round shaft 32 is connected to a jaw 34 by a key 35. The jaw 34 includes a cylindrical portion 36 and a cylindrical axial opening 38 extending therethrough to receive the powered shaft 32. The jaw 34 is axially stationary on the powered shaft 32. An integral semicylindrical portion 40 is provided on the jaw 34 for mating engagement with a similar shaped semicylindrical portion 42 on a jaw 44 which also includes a cylindrical portion 46 connected to a drive shaft 48 by a key 49.

It is seen that the inner end 50 of the driven shaft 48 is received closely adjacent the powered shaft 32 inside the cylindrical portion 36 of the jaw 34 to maintain the shafts 32 and 48 relatively rigid against lateral flexing.

The jaw 44 is axially slidable on the driven shaft 48 by virtue of the key 49 being movable in the key slot 52 in the driven shaft 48. An annular recess 54 is provided in the jaw 44 between the jaw portions 42 and 46 and is adapted to receive a yoke 56 carried on a downwardly extending pin 58 connected to an actuating member 60 movable in a horizontal plane for moving the jaw 44 into and out of engagement with the mating jaw 34. It is seen that the pin 58 is received in an opening 62 in the actuating member 60 and the actuating member is adapted to pivot about its pivotal connection 64 at its outer end. An upstanding handle 66 is provided for operating the actuating member 60.

As seen in FIG. 2 on the left-hand side where the clutch unit 28 is assembled the actuating lever 60 is pivoted about the axis 64 where the lever is pivotally connected to the floor board 70 of the font body unit 24. A pin 72 is received in an opening in the floor 74 for locking the clutch in either an engaged or disengaged position as shown by the solid and dash lines respectively.

In operation it is thus seen that it is only necessary to move the actuating lever 60 to the left or the right to operate the clutches 28 for supplying power to the front wheels 26 of the all terrain type vehicle 12. As seen in FIG. 3 the clutch 28 on the right is disengaged while the clutch on the left is in engagement thus supplying power to the left front wheel only. The semicylindrical jaw portions 40 and 42 which matingly engage each other provide positive locking action for transmitting power from the power shaft 32 to the driven shaft 48. It is seen that the jaw 34 is axially stationary while the jaw 44 is axially movable due to the key 49 sliding in the slot 52 in the driven shaft 48.

It is further noted that a pair of bearing supports 80 are provided adjacent the sidewalls of the front body 14 and are mounted on the floor board 70. The driven shafts 48 extend through the body sidewalls and are connected to U-joints not shown which in turn are connected through a king pin to the front wheel such that the front wheel can be powered as well as turned through a steeeing mechanism connected to the king pin.

We claim:

1. In a vehicle having a body and front wheels,
   a drive assembly comprising oppositely extending powered shafts extending from a bear box disposed in the transverse center between said front wheels;
   a clutch unit being provided on each side of said gear box for selectively and individually engaging said powered shafts for driving said front wheels;
   each of said clutch units having a first jaw on said powered shaft, and a second jaw on a driven shaft, each of said jaws keyed to and rotatable with its respective shaft;
   an actuating member in engagement with one of said jaws for moving said one jaw between a first position disengaged from said other jaw to a second position in engagement with said other jaw;
   said first and second jaws are defined as semicylindrical portions adapted to matingly engage each other to form a cylinder when in overlapping relationship,
   said one jaw being slidable on its shaft for being moved into and out of engagement with said other jaw; and
   said powered shaft and said driven shaft have adjacent ends fully disposed in one of said jaws at all times.

2. The structure of claim 1 wherein said actuating member is further defined as a semicylindrical portion being received in an annular recess formed in said one jaw, and a downwardly extending pin engaging a lever having a handle on one end and a pivotal connection to said vehicle body at the other end.

3. The structure of claim 3 wherein said one jaw includes a cylindrical portion at the opposite end of said semicylindrical portion and said annular recess is disposed therebetween.

4. The structure of claim 3 wherein a lock pin is adapted to be received in an opening in said vehicle body and the width of said lever is such that when said lever is moved to a first position upon said one jaw being in said first position said pin is on one side of said lever and when said lever is moved to a second position upon said one jaw being in said second position said pin is on the opposite side of said lever whereby said clutch is selectively locked in engaged and disengaged positions.

* * * * *